United States Patent
Nichols et al.

(10) Patent No.: US 7,779,079 B2
(45) Date of Patent: Aug. 17, 2010

(54) REDUCING UNSOLICITED INSTANT MESSAGES BY TRACKING COMMUNICATION THREADS

(75) Inventors: David A Nichols, Redmond, WA (US); Chris G. Parker, Seattle, WA (US); Ben D Garrison, Bellevue, WA (US); Per-Ola A Orvendal, Kirkland, WA (US); Wendy L Lehman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 11/760,536

(22) Filed: Jun. 8, 2007

(65) Prior Publication Data

US 2008/0307038 A1    Dec. 11, 2008

(51) Int. Cl.
  G06F 15/16    (2006.01)
(52) U.S. Cl. .................... 709/206; 709/204; 726/23
(58) Field of Classification Search ......... 709/203–206; 726/23
  See application file for complete search history.

(56) References Cited

U.S. PATENT DOCUMENTS

| | | | |
|---|---|---|---|
| 6,769,016 | B2 | 7/2004 | Rothwell et al. |
| 7,016,939 | B1 | 3/2006 | Rothwell et al. |
| 7,131,003 | B2 | 10/2006 | Lord et al. |
| 7,548,956 | B1 * | 6/2009 | Aoki et al. .................. 709/207 |
| 2004/0210772 | A1 | 10/2004 | Hooker et al. |
| 2005/0021649 | A1 * | 1/2005 | Goodman et al. ........... 709/207 |
| 2005/0097179 | A1 | 5/2005 | Orme |
| 2005/0171954 | A1 | 8/2005 | Hull et al. |
| 2005/0198160 | A1 | 9/2005 | Shannon et al. |
| 2006/0015942 | A1 * | 1/2006 | Judge et al. .................. 726/24 |
| 2006/0036694 | A1 * | 2/2006 | Pricken et al. .............. 709/206 |
| 2006/0101021 | A1 | 5/2006 | Davis et al. |
| 2006/0168009 | A1 | 7/2006 | Lyle et al. |
| 2006/0168048 | A1 | 7/2006 | Lyle et al. |
| 2007/0016641 | A1 | 1/2007 | Broomhall |
| 2007/0039040 | A1 | 2/2007 | McRae et al. |
| 2007/0041372 | A1 | 2/2007 | Rao et al. |
| 2007/0088793 | A1 * | 4/2007 | Landsman .................. 709/207 |

(Continued)

OTHER PUBLICATIONS

Burke et al., Introductions and Requests: Rhetorical Strategies that Elicit Response in Online Communities, Jun. 29, 2007.*

(Continued)

Primary Examiner—Nathan Flynn
Assistant Examiner—James E Conaway
(74) Attorney, Agent, or Firm—Lee & Hayes, PLLC

(57) ABSTRACT

Processes and techniques for reducing spam over instant messaging (SPIM) are described. In one implementation, the number of open instant messaging threads ("chat threads") that a specific user can have at a given time is limited to prevent a potential spimmer from flooding instant messaging users with SPIM. Another implementation combines the technique of limiting the number of open instant messaging threads with a user feedback technique that enables users to inform an instant messaging service or other entity about users that are sending SPIM or other undesirable content. Another implementation combines the technique of limiting the number of open instant messaging threads with a text analysis technique that enables an instant messaging service or other entity to analyze text generated by a user to determine if the user is sending SPIM or other undesirable content to other instant messaging users.

12 Claims, 7 Drawing Sheets

U.S. PATENT DOCUMENTS

2007/0107059 A1    5/2007    Chasin et al.

OTHER PUBLICATIONS

Williamson et al., Virus Throttling for Instant Messaging, May 5, 2004.*

Liu et al., Detecting and Filtering Instant Messaging Spam—A Global and Personalized Approach, Nov. 6, 2005.*

Liu, et al., "Detecting And Filtering Instant Messaging Spam—A Global And Personalized Approach", retrieved on Apr. 25, 2007, at <<http://ieeexplore.ieee.org/xpl/freeabs_all.jsp?tp=&arnumber=1532048&isnumber=32677>>, IEEE, 2006, pp. 1.

Mannan, et al., "Secure Public Instant Messaging: A Survey", available at least as early as Apr. 26, 2007, at <<http://dev.hil.unb.ca/Texts/PST/pdf/mannan.pdf>>, pp. 69-77.

* cited by examiner

REDUCING UNSOLICITED INSTANT MESSAGES BY TRACKING COMMUNICATION THREADS

BACKGROUND

The internet and other networks have greatly enhanced the ability of individuals to communicate. Among the communication tools that utilize these networks are instant messaging services. Instant messaging services enable users to communicate with each other via real time or quasi-real time exchange of text and images. Like other communication media, however, instant messaging services are prone to abuse by advertisers and other purveyors of undesirable or inappropriate content. One example of such content is commonly known as "spam", which refers generally to unsolicited bulk messages sent over electronic communication media. In the context of instant messages services, spam is also referred to as "SPIM", or "spam over instant (or internet) messaging." Individuals and entities that transmit SPIM and other inappropriate or undesirable content are commonly known as "spimmers". The abuse of instant messaging services by spimmers ties up valuable network bandwidth and degrades the overall user experience for legitimate instant messaging users. While various techniques have been implemented to stem the spread of SPIM, the problem persists.

SUMMARY

This summary is provided to introduce spam over instant messaging techniques and processes, which are further described below in the Detailed Description. This summary is not intended to identify essential features of the claimed subject matter, nor is it intended for use in determining the scope of the claimed subject matter.

This disclosure is directed to processes and techniques for reducing spam over instant messaging (SPIM). In one implementation, the number of open instant messaging threads ("chat threads") that a specific user can have at a given time is limited to prevent a potential spimmer from flooding instant messaging users with SPIM. Another implementation combines the technique of limiting the number of open instant messaging threads with a user feedback technique that enables users to provide feedback to an instant messaging service or other entity about users that are sending SPIM or other undesirable content. Another implementation combines the technique of limiting the number of open instant messaging threads with a text analysis technique that enables an instant messaging service or other entity to analyze text generated by a user to determine if the user is sending SPIM or other undesirable content to other instant messaging users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
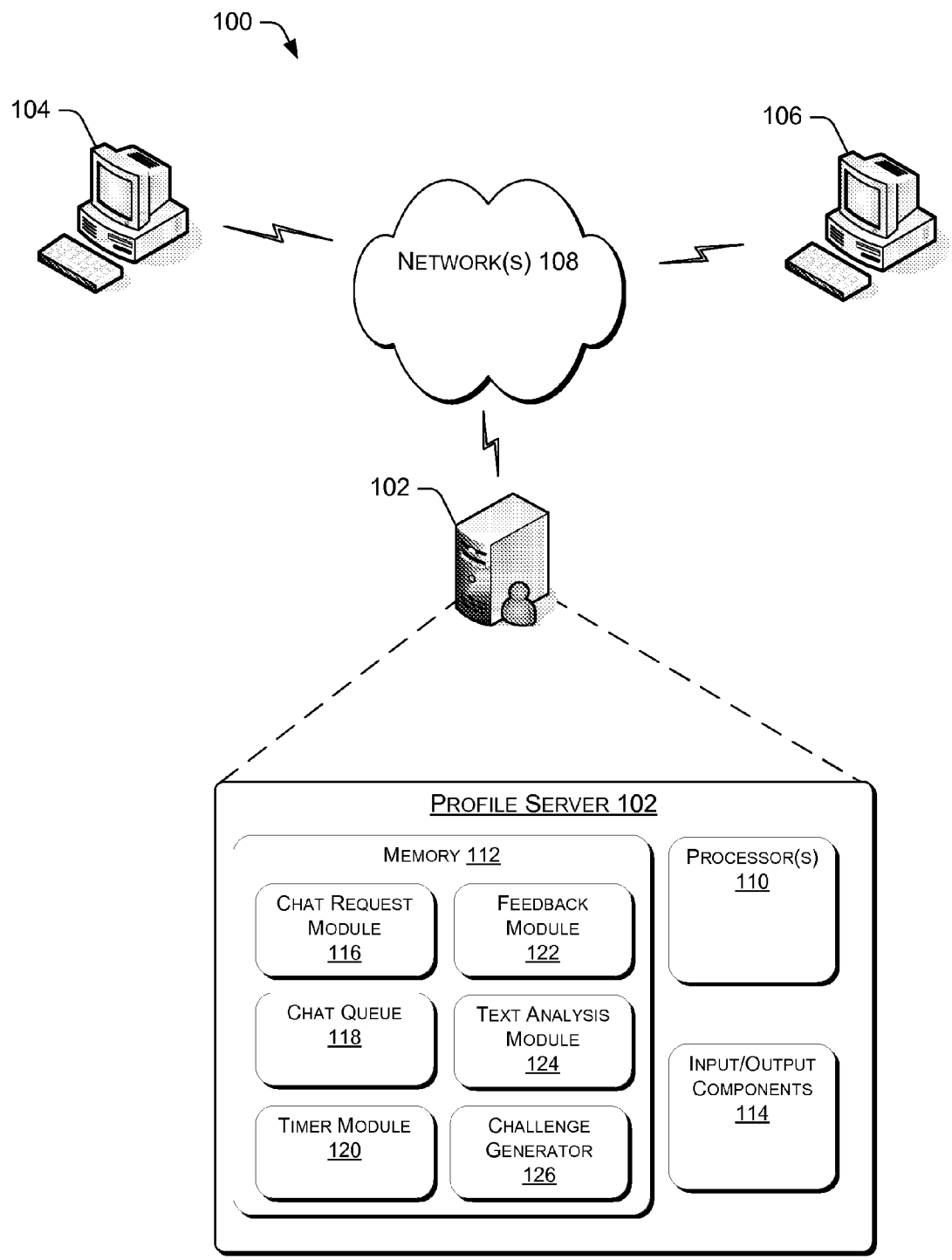
FIG. 1 illustrates one example of an environment for implementing spam over instant messaging control processes and techniques.

Described herein are processes and techniques for limiting the proliferation of spam over instant messaging (SPIM). The processes and techniques may be implemented by an instant messaging service (also known as a chat service), a peer-to-peer network, or any other suitable entity. A chat service may also be implemented via a peer-to-peer network. A chat service provides the hardware and/or software facilities to host a chat network and facilitate the communication of chat users. The chat service can implement a rate limiting technique that limits the number of open chat threads that a particular chat user may have at a given time. Chat threads are created when a chat user invites another user (an "invitee") to engage in an instant messaging conversation with the chat user. This is also known as inviting the invitee to chat. Chat threads remain open, or "pending", as long as the invitation to chat remains without a reply from the invitee or the chat thread has not timed out.

While a human chat user may be limited in the volume of chat traffic that the user can generate during a specific time period, computer automation enables spimmers and other entities to send vast amounts of SPIM almost instantly. One example of such computer automation is a bot. A bot is a device or software module that can execute commands, reply to messages, or perform routine tasks in computerized and online environments, either automatically or with minimal human intervention. Thus, a bot can be programmed to send SPIM disguised as chat invitations and other legitimate chat content to a multitude of chat users. However, the bot must still be associated with a particular user alias or user identifier. By limiting the number of open chat threads that a particular user may have at a given time, the chat service limits a bots ability to send large volumes of SPIM over a short period of time. As used herein, the term "user" or "chat user" may refer to a human user, a computerized user, or a combination of human and computerized users.

User feedback is also utilized to determine if a chat user is engaging in offending chat behavior such as sending SPIM. A chat service can enable chat users to submit user feedback, and based on the feedback, the chat service can implement further procedures to determine if the user is a bot or other entity that is sending SPIM to chat users.

Text analysis enables a chat service to analyze text generated by a chat user to determine if the chat user is transmitting SPIM. The text analysis can look for particular words or groupings of words that indicate a high likelihood that the particular chat content being analyzed is SPIM.

Rate limiting, user feedback and text analysis techniques can be combined in different ways to further limit to ability of a spimmer to transmit large quantities of SPIM using a particular instant messaging service. The techniques described herein may be used in many different operating environments and systems. Multiple and varied implementations are described below. An exemplary environment that is suitable for practicing various implementations is discussed in the following section.

Illustrative Operating Environment

FIG. 1 illustrates one illustrative operating environment 100 that can utilize the described processes and techniques. However, the processes and techniques described herein are more broadly applicable to any other network or other collection of computing devices. Operating environment 100 includes a profile server 102, a chat initiator 104 and a chat invitee 106. Profile server 102 may be implemented in many ways including, for example, as a standalone general purpose computing device or mainframe, or as a cluster of servers (e.g., arranged in a server farm). Profile server 102 may host a chat service and perform chat server functions. Other exemplary operating environments may use a chat service that utilizes connection servers, chat servers, and other network resources.

Chat initiator 104 and chat invitee 106 may be implemented in any number of ways including, for example, as general purpose computing devices, laptops, mobile computing devices, PDAs, cellular phones, satellite devices, and so on. Further, chat initiator 104 and chat invitee 106 may be operated by entities such as human users, automated users (e.g., "bots"), or a combination of human and automated users. The entities in environment 100 are connected by and can communicate with each other via a network(s) 108. Network(s) 108 may include, but is not limited to, a Local Area Network (LAN), a Wide Area Network (WAN), and a Metropolitan Area Network (MAN). Further, network(s) 108 is representative of a wireless network, a wired network, or a combination thereof.

Profile server 102 includes one or more processor(s) 110 coupled to a system memory 112. Processor(s) 110 may include, for example, microprocessors, microcomputers, microcontrollers, multi-core processors, and so forth. Processor(s) 110 are configured to retrieve and execute computer-program instructions stored in system memory 112. System memory 112 includes computer-readable media in the form of volatile memory, such as Random Access Memory (RAM) and/or non-volatile memory, such as Read Only Memory (ROM) or flash RAM. Input/output components 114 (e.g., a mouse and keyboard) provide data input and output capabilities for profile server 102.

Profile server 102 also includes various components that track, analyze, and store online chat behaviors of chat users. These components include a chat request module 116, a chat queue 118, a timer module 120, a feedback module 122, a text analysis module 124, and a challenge generator 126. Chat request module 116 processes queries to determine if a chat user is permitted to open a new chat thread. Chat queue 118 tracks a chat user's open chat threads. In one example, an open chat thread is created when chat initiator 104 sends an invitation to chat invitee 106 inviting the invitee to begin an online chat session. The chat thread is closed when the chat invitee replies to the invitation or the open chat thread times out.

Timer module 120 tracks temporal aspects of chat conversations. For example, timer module 120 can time how long a particular chat thread has been open or pending in chat queue 118. Feedback module 122 is configured to solicit and/or receive feedback about chat service users. Text analysis module 124 is configured to analyze text that is generated during a chat conversation. Challenge generator 126 is configured to generate and/or transmit challenges that can be used to verify and/or authenticate the identity of chat service users (e.g., that the chat service user is a human entity and not an automated SPIM generator, such as a bot). These aspects and components of profile server 102 are discussed in more detail below.

To initiate a chat session, chat initiator 104 provides an indication that the chat initiator wants to start a new chat session by sending a chat invitation to chat invitee 106. In one example, this is done through user interaction with a chat user interface that is displayed on chat initiator 104.

As part of the chat session initiation process, chat initiator 104 queries profile server 102 to determine if chat initiator 104 is permitted to initiate a new chat session. Chat request module 116 receives the query on profile server 102 and determines if chat initiator 104 has any open chat threads in chat queue 118. In the event that chat initiator 104 has accumulated a threshold number of open chat threads in chat queue 118, profile server 102 indicates to chat initiator 104 that the chat initiator has reached a threshold number of chat threads and cannot open any new chat threads.

In the event that chat request module 116 determines that the number of open chat threads initiated by chat initiator 104 is below the threshold amount, the chat request module indicates that chat initiator 104 may begin a new chat conversation. The chat invitation initiated by chat initiator 104 is forwarded to chat invitee 106 and a new open chat thread associated with the chat invitation is logged in chat queue 118. In some implementations, the chat invitation is sent to a connection server associated with chat invitee 106, which then forwards the chat invitation to the chat invitee.

Timer module 120 is notified of the new chat thread and begins tracking the time that the chat thread is open in the chat queue. Chat invitee 106 may accept the chat invitation by replying to chat initiator 104, or the chat invitee may ignore the invitation. In the event that the chat invitee replies to the chat invitation, profile server 102 is notified that the chat invitation has received a reply, the open chat thread is designated as closed (or "acknowledged"), and the thread is removed from chat queue 118. In the event that chat invitee 106 does not reply to the chat invitation, the open chat thread will remain in the chat queue and will accumulate "open time" as tracked by timer module 120. If the open chat thread reaches or exceeds a threshold open time (or "pending time"), the chat thread will time out and the chat invitation will be withdrawn from chat invitee 106. The open chat thread will then be removed from chat queue 118.

Figure 2:
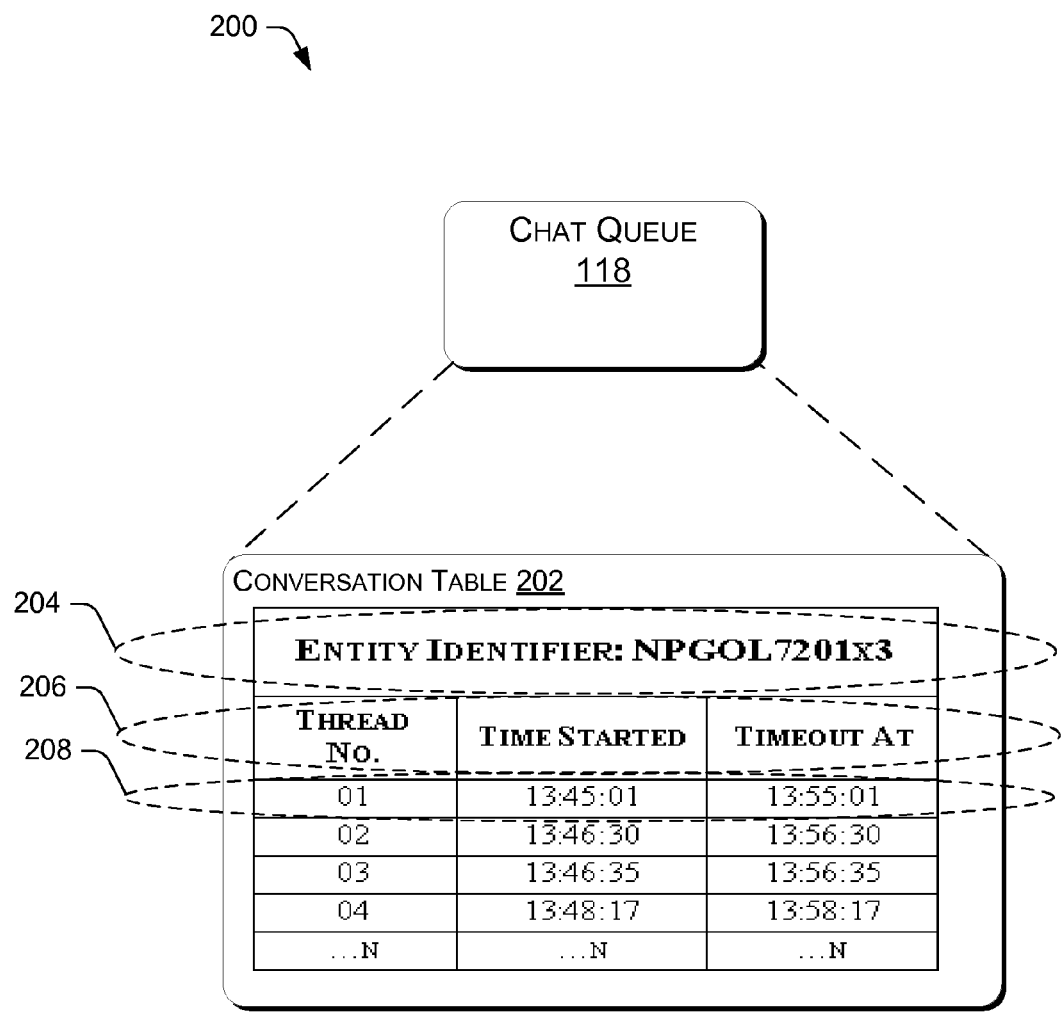
FIG. 2 illustrates one example of a chat queue that tracks open chat threads for particular instant messaging users.

FIG. 2 illustrates at 200 one example of chat queue 118. Chat queue 118 includes a conversation table 202 that tracks various aspects of a user's online chat behavior. As shown at 204, conversation table 202 includes an entity identifier that identifies a specific chat user. Any suitable identifier can be used, such as a media access control (MAC) address, a chat alias, an internet protocol (IP) address, and so on. As shown at 206, conversation table 202 includes fields that track a thread number for each open chat thread, a start time that indicates when each chat thread was opened, and a timeout time that indicates when each chat thread will time out. While the timeout field in this example indicates a ten minute timeout period, this is for purposes of example only, and the timeout period may be set for any suitable length of time. Further, each open chat thread may have a different timeout period. Data record 208 illustrates one example of tracking data for an open chat thread. As shown, this record is for chat thread number one that was opened at 13:45:01 and will timeout at 13:55:01. If the open chat thread receives a reply prior to 13:55:01, the thread will be removed from the conversation table. Otherwise, the open chat thread will timeout at 13:55:01 and will be removed from the queue on or after that time.

Illustrative Processes

Illustrative processes are described in this section with additional reference to FIGS. 1-2. The processes are described in the context of environment 100 shown above for convenience only, and the processes are broadly applicable to other systems and environment of networked components.

Figure 3:
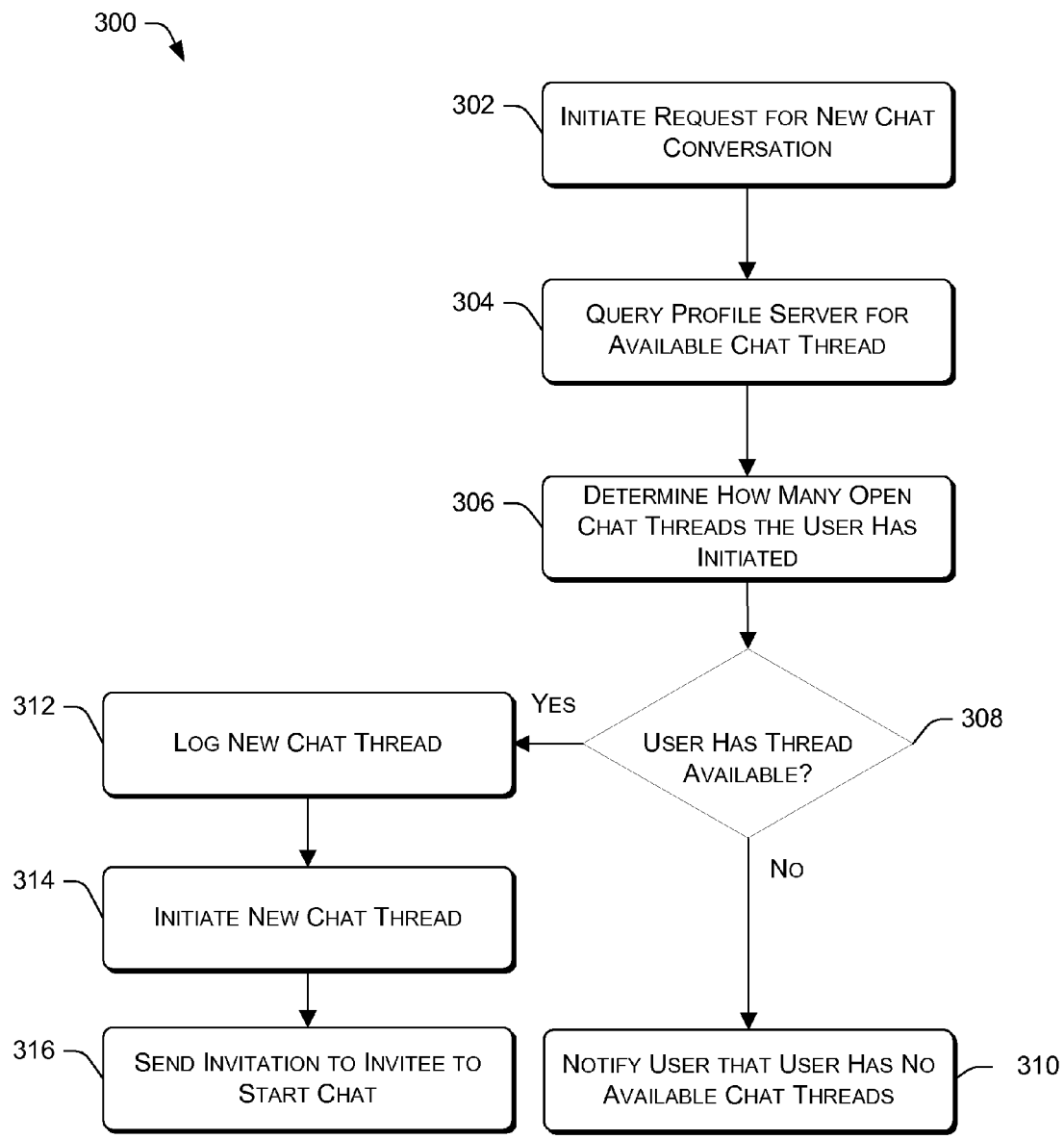
FIG. 3 is a flow diagram of a process for limiting the number of open chat threads that a particular user may have.
Figure 4:
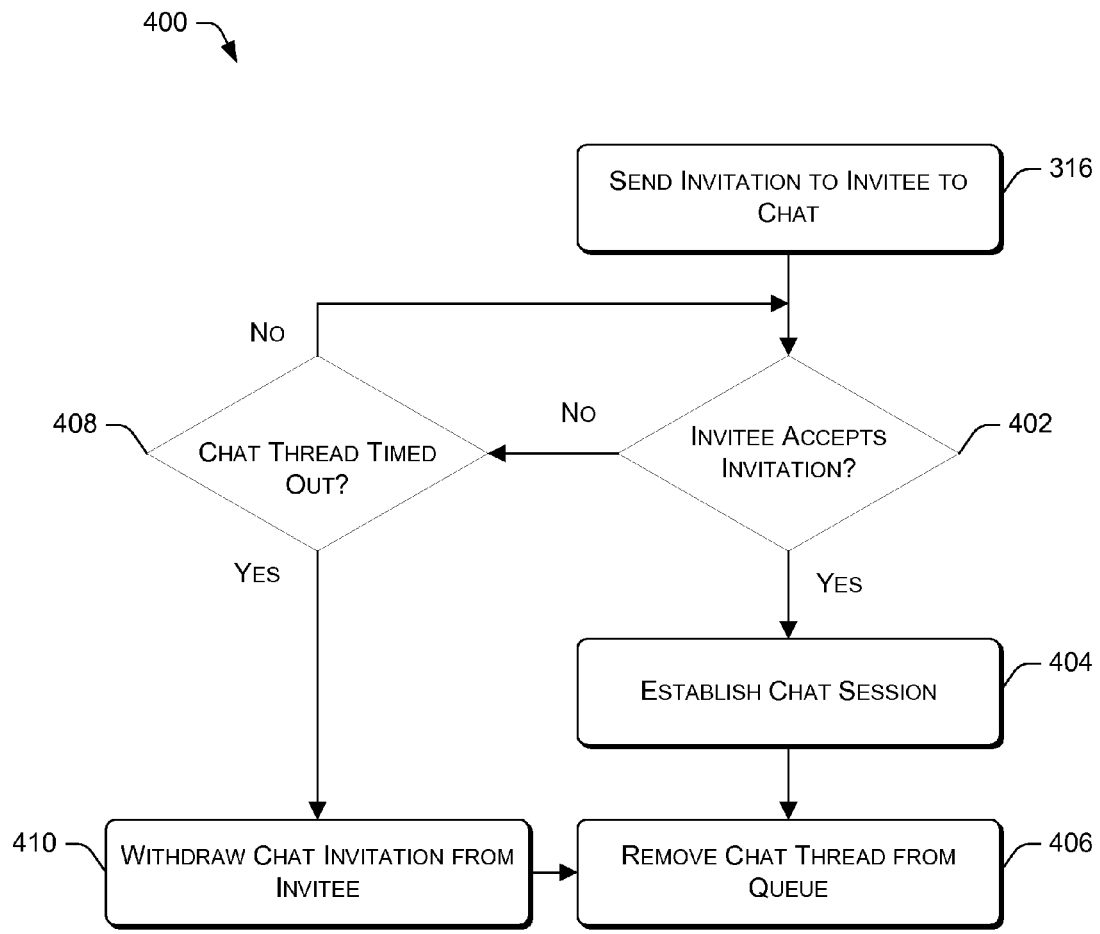
FIG. 4 is a flow diagram of particular aspects of a process for limiting the number of open chat threads that a particular user may have.
Figure 5:
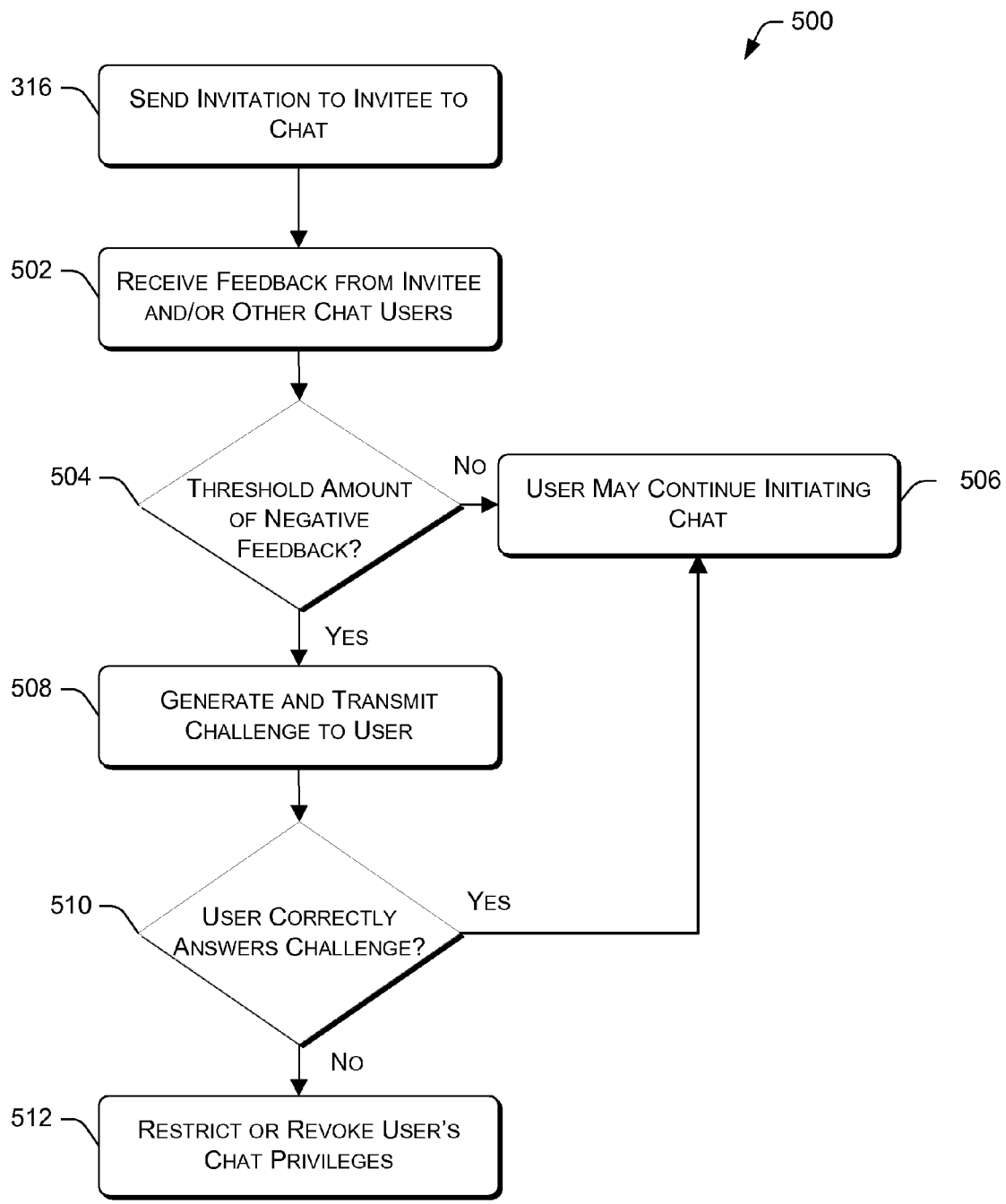
FIG. 5 is a flow diagram of a process for incorporating user feedback into an online chat environment.
Figure 6:
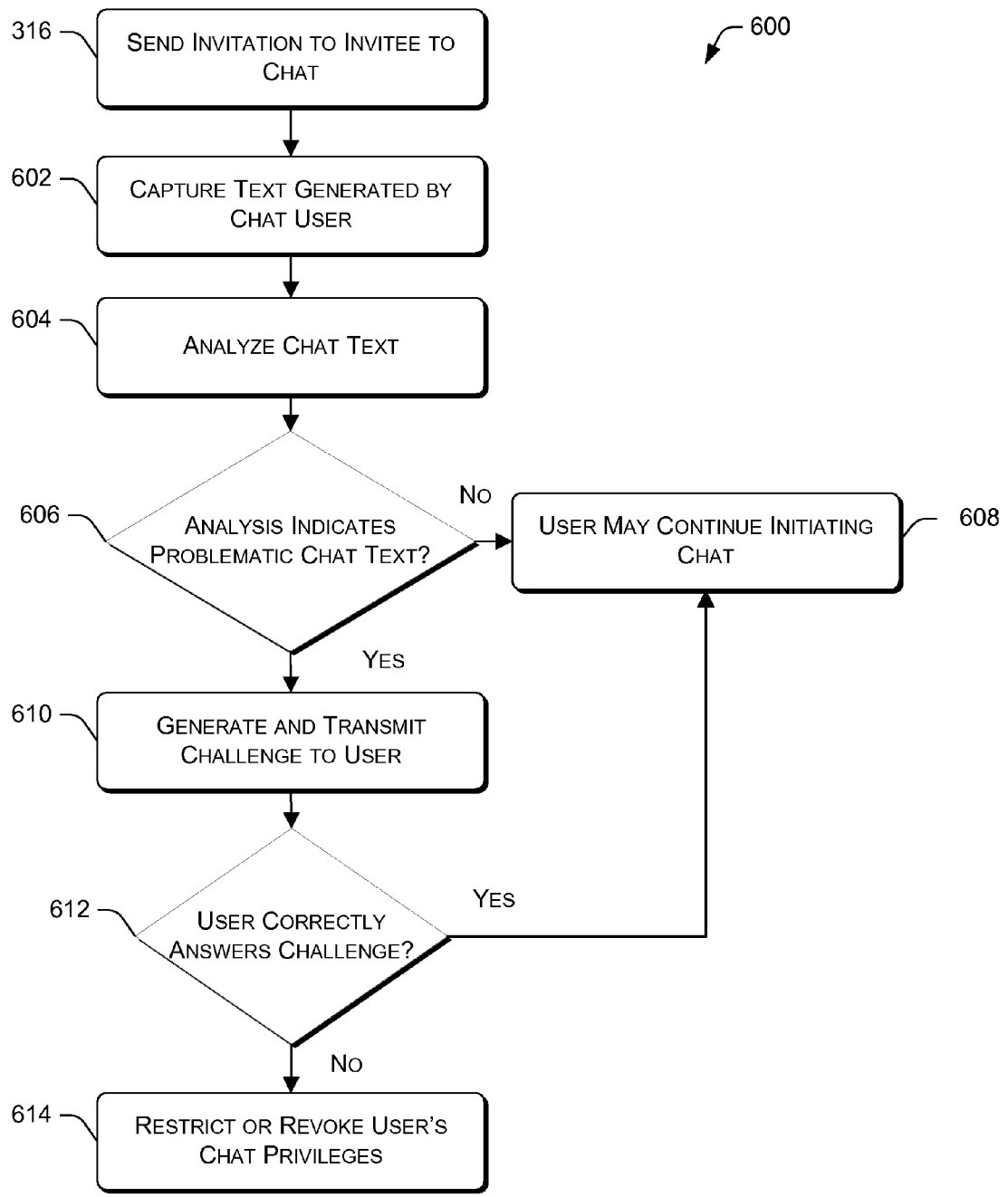
FIG. 6 is a flow diagram of a process for incorporating text analysis into an online chat environment.
Figure 7:
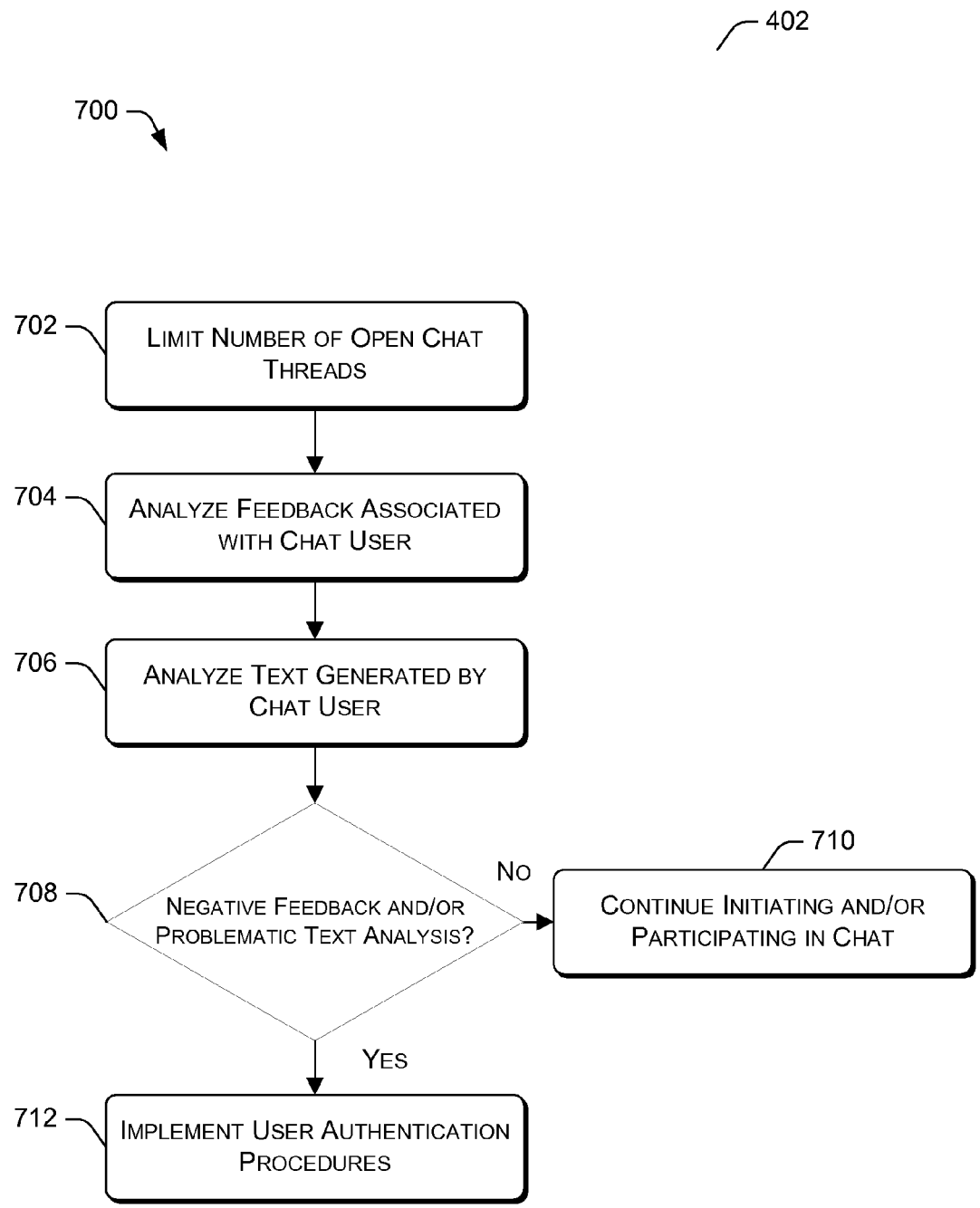
FIG. 7 is a flow diagram of a process for incorporating rate limiting, user feedback and text analysis into an online chat environment.

FIG. 3 provides an overview of a process for starting a new chat conversation and FIG. 4 illustrates particular aspects of chat conversation initiation and monitoring processes. FIG. 5 illustrates the incorporation of user feedback to enable a chat service to limit SPIM and FIG. 6 illustrates the incorporation of text analysis to determine if a user is transmitting SPIM via a chat service. FIG. 7 illustrates a process for combining rate limiting, user feedback and text analysis to limit the proliferation of SPIM and other inappropriate content via a chat service.

The illustrative processes may be described in the general context of computer executable instructions and are illustrated as collections of blocks in logical flowcharts, which represent sequences of operations that can be implemented in hardware, software, or a combination thereof. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

FIG. 3 illustrates at 300 one example of a process for initiating a new chat conversation. At 302, a user initiates a request to start a new chat conversation. In one example, act 302 is in response to the user sending a chat invitation to another user (an "invitee") to chat with the user. At 304, the profile server is queried to determine if the user has any available chat threads that can be used to start a new chat conversation. At 306, the profile server determines the number of open chat threads the user currently has. As discussed above, chat request module 116 can make this determination by checking chat queue 118 for open chat threads that the user has initiated.

At 308, the profile server determines if the user has any available chat threads by comparing the number of open chat threads that the user currently has with a threshold number. For example, the user may be permitted to have ten open chat threads pending at any given time (i.e., the threshold number equals ten). If the user has less than ten, the user is permitted to open a new chat thread and begin a new chat conversation. Otherwise, if the user has ten or more chat threads pending, the user is not permitted to open a new chat thread. This scenario is presented for purposes of example only, and the threshold number of open chat threads for a particular user may be set to any suitable number.

If the user has no available chat threads (i.e., the user has reached or exceeded the threshold number of chat threads), at 310 the profile server notifies the user that the user may not initiate a new chat conversation since the user has reached the threshold number of open chat threads (i.e., pending chat conversations).

If the user has an available chat thread, at 312 the profile server logs the new chat thread in the chat queue. At 314, the profile server initiates a new chat thread. At 316, the original chat invitation is forwarded to the invitee. The invitee may then respond to the chat invitation or ignore it.

FIG. 4 illustrates at 400 further aspects of the process illustrated in FIG. 3. At 316, a chat invitation is forwarded to the invitee. At 402, it is determined if the invitee has accepted the invitation to chat with the user by replying to the invitation. If the invitee has replied to the invitation, at 404 a chat session is established between the user and the invitee. In one implementation, this signifies that the invitee agrees to chat with the user. At 406, the open chat thread is considered closed and the thread is removed from the chat queue.

In some implementations, if a user replies to a chat invitation, the chat invitation is deemed to not be SPIM. Thus, chat invitations that receive replies are removed from the chat queue and do not count against a chat user's threshold number of open chat threads. Other ways can be provided for determining that open chat threads are not SPIM and removing the open chat threads from a chat queue, such as user feedback and text analysis. These techniques are discussed in more detail below.

If the invitee has not replied to the invitation, it is determined at 408 if the open chat thread initiated by the user has timed out. As discussed above, a timer module on the profile server tracks the pending time for each open chat thread in the chat queue. Each chat user and/or each open chat thread is assigned a pending period or time, after which open an chat thread will time out and a chat invitation will be withdrawn. When an open chat thread times out, the thread is removed from the chat queue and the chat invitation is no longer pending before the chat invitee.

If the open chat thread has not timed out, the process returns to 402 and determines if the invitee has replied to the chat invitation. If the open chat thread has timed out, at 410 the chat invitation is withdrawn from the invitee. At 406, the open chat thread is considered closed and the thread is removed from the chat queue.

FIG. 5 illustrates at 500 one example of a process for incorporating user feedback into a chat environment. Process 500 is discussed with reference to process 300, discussed above, and may be combined with other discussed processes and techniques to limit the proliferation of unwanted chat activity, such as SPIM. The process can be wholly or partially implemented by a feedback module, such as feedback module 122.

At 316, a chat invitation is forwarded to the invitee. At 502, feedback is received from invitee(s) and/or other chat users concerning the chat behavior of the user. The feedback can include qualitative data, such as a rating of the user. Thus, the feedback can be positive, neutral, or negative in nature. The feedback enables a chat service to track chat users and to determine if certain chat users are engaging in inappropriate chat behavior, such as sending SPIM or other inappropriate content to other chat users. For example, the chat service can provide a feedback mechanism as part of a chat user interface that allows chat users to submit feedback about other chat users. The chat user interface can specify options for negative feedback such as "flag this user for unsolicited advertising", "flag this user for sending inappropriate content", or some other mechanism by which a user can forward feedback to the chat service.

At 504, it is determined if a threshold amount of negative feedback associated with the user has been received. A threshold amount of negative feedback may consist of feedback associated with the user reaching a threshold level of negative responses. A chat service can set a threshold for the number of negative feedback responses that a specific chat user can receive before a certain action is taken. For example, the chat service can specify that individual chat users can receive twenty negative responses before the chat service will take an action to determine if the chat user's chat privileges should be restricted and/or withdrawn.

If it is determined that a threshold amount of negative feedback associated with the user has not been received, at 506 the user may continue initiating chat conversations. If it is determined that a threshold amount of negative feedback associated with the user has been received, at 508 the chat service generates and transmits a challenge to the user to determine if the user is a human user or is some type of automated user (e.g., a bot) that has been configured to automatically transmit chat content (e.g., SPIM) to other chat users. Act 508 can be implemented either wholly or in part by a challenge generator, such as challenge generator 126.

One example of a challenge is a human interactive proof (HIP) challenge. A HIP challenge is a type of challenge-response test used in computing systems to determine whether or not a user is human. In one example, a word and/or image is presented to the user and the user is asked to identify the word and/or image. The word and/or image is distorted such that traditional computer-implemented text and image recognition methods cannot recognize the word and/or image, but most human users can recognize the image. Thus, most humans can respond correctly to the HIP challenge, but computers cannot. One example of a HIP challenge is presenting a chat user with an image of a clock face and asking the user to provide the time of day represented by the position of the clock hands on the clock face image. Most computer-implemented image recognition techniques are not sufficiently sophisticated to interpret this challenge and provide a correct answer, whereas most human users can correctly answer the question with little effort.

At 510, it is determined if the user has correctly answered the challenge. If the user has correctly answered the challenge, at 506 the user may continue initiating chat conversations. If the user fails to correctly answer the challenge, at 512 the user's chat privileges are restricted or revoked. In one example, the user is prevented from initiating any further chat conversations. Other actions may be taken in response to a failure to correctly answer a challenge, such as submitting a further challenge to give the user an additional chance to provide a correct answer, or initiating some type of appeal process whereby a user can interact with the chat service and undergo further procedures that seek to verify that the chat user is a human entity and/or that the user is not transmitting SPIM and other inappropriate content via the chat service.

The previously discussed processes that limit the number of open chat threads that a user may have can be combined with the user feedback process to enable a chat service to slow the rate at which a spimmer sends SPIM and thus increase the ability of the user feedback system to identify potential spimmers while minimizing SPIM proliferation.

In addition to identifying potential spimmers, the user feedback system may also be used to identify chat threads that are not SPIM and chat users that are not spimmers. For example, if a chat service receives positive feedback that indicates that the user is not sending SPIM, the user can be flagged as a legitimate user (i.e., as a "non-spimmer"). Such feedback can be collected from other chat users and can include input such as "flag this user as legitimate" or "flag this user as a non-spimmer". Based on a threshold amount of positive feedback, the chat service can allow these users to have higher open chat thread thresholds. That is, users that attain a threshold level of positive feedback (e.g., twenty-five or more) may be granted the ability to have more pending chat threads than they previously had and/or than other chat users have.

FIG. 6 illustrates at 600 one example of a process for analyzing text generated during a chat conversation to determine if a chat user is transmitting SPIM or other inappropriate content over a chat service. Process 600 is discussed with reference to process 300, discussed above, and may be combined with other discussed processes and techniques to limit the proliferation of unwanted chat activity, such as SPIM. The process can be wholly or partially implemented by a text analysis module, such as text analysis module 124.

At 316, a chat invitation is forwarded to the invitee. At 602, chat text generated by the chat user during chat activity is captured. The chat text may be captured from an initial chat invitation and/or from a resulting chat conversation. At 604, the chat text is analyzed using any suitable text analysis technique. The chat text may be analyzed for words and/or groupings of words that indicate that the user is transmitting SPIM or other inappropriate content.

At 606, it is determined if the text analysis indicates any problematic chat content in the chat text. Problematic chat content includes words or groupings of words that indicate that the chat text is potentially SPIM and/or other inappropriate content. For example, a text analysis technique may have a bank of words and/or word groups that it uses to search chat text. If it finds these words and/or word groups in a particular section of chat text, the technique may flag the chat text as SPIM. If no problematic chat conversation content is detected, at 608 the chat user may continue initiating chat conversations. The text analysis may also implement a threshold amount of problematic chat content that a particular user can reach before the user is flagged as a spimmer.

If problematic chat content is detected, at 610 a challenge (e.g., a HIP challenge) is generated and transmitted to the user from which the problematic chat content originated. Processes and techniques for generating and transmitting challenges are discussed above. At 612, it is determined if the user correctly answers the challenge. If the user correctly answers the challenge, at 608 the user may continue initiating and participating in chat conversations. In some implementations, the user may be warned that problematic chat content has been detected in the user's chat conversations and that the user's chat privileges may be restricted or revoked if it is determined that the user is transmitting SPIM or other inappropriate content using the chat service.

If the user fails to correctly answer the challenge, at 614 the user's chat privileges are restricted or revoked. In one example, the user is prevented from initiating further chat conversations. Other actions may be taken in response to a failure to correctly answer a challenge, such as submitting a further challenge to give the user an additional chance to provide a correct answer, or initiating some type of appeal process whereby a user can interact with the chat service and undergo further procedures that seek to verify that the chat user is a human entity and/or that the user is not transmitting SPIM or other inappropriate content via the chat service.

Text analysis may also be used to identify chat users that are not sending SPIM. A chat service can perform text analysis on chat text that originates from a chat user (e.g., a chat invitation to an invitee) and if the chat service determines that there is no problematic text, the chat service can flag the chat content as "non-SPIM". If the chat content was captured from an open chat thread in a chat queue, the chat service can remove the chat thread from the chat queue. Thus, the chat thread that is flagged as "non-SPIM" no longer counts against the user's threshold amount of open chat threads.

FIG. 7 illustrates at 700 one example of a process that utilizes a combination of rate limiting, user feedback, and text analysis to detect SPIM and reduce the proliferation of SPIM and other inappropriate content in chat environments. The process may be used in tandem with or combined with any or all of the previously discussed processes.

At 702, the number of open chat threads that a user may have over a given time period is limited according to a specific threshold. This serves as a rate limiter that limits the number of new chat conversations (e.g., new chat invitations) that a chat user can initiate during a given time frame. At 704, feedback associated with the user is analyzed to determine if the nature and/or the quantity of the feedback indicates that the user is transmitting SPIM or other inappropriate content using the chat service. At 706, chat text that is generated by the user is analyzed for words and/or words patterns that indicate that the user is transmitting SPIM or other inappropriate content using the chat service.

At 708, it is determined if the user feedback and/or text analysis indicates that the user may be transmitting SPIM or other inappropriate content using the chat service. If the user feedback and/or text analysis do not indicate sufficient negative feedback and/or problematic chat text, at 710 the user is permitted to continue initiating and engaging in chat conversations. If the user feedback and/or text analysis indicate sufficient negative feedback and/or problematic chat text, at 712 authentication procedures are implemented to ensure that the user is a human user and that the user is not transmitting SPIM or other inappropriate content using the chat service. One example of an authentication procedure is transmitting a challenge to the user, as discussed above. If the user fails the authentication procedures, the user's authorization to initiate and/or otherwise participate in chat conversations may be limited or revoked.

In the discussed examples, the user feedback and text analysis techniques provide a way to detect chat users that are potentially distributing SPIM using a chat service. The rate limiting aspect further enhances these techniques by giving the user feedback and text analysis techniques time to identify the spimmer and prevent the spimmer from distributing SPIM (e.g., by restricting or revoking the spimmer's chat privileges) before the spimmer can flood chat users with SPIM.

While various illustrative device and operating implementations have been described, the components, modules, and features of these implementations may be rearranged, modified, and/or may be omitted entirely, depending on the circumstances.

Also, it should be understood that certain acts in the methods need not be performed in the order described, may be rearranged, modified, and/or may be omitted entirely, depending on the circumstances.

Moreover, any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Combinations of the any of the above should also be included within the scope of computer-readable media.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention.

What is claimed is:

1. A method comprising:
   receiving a request from an entity to start a new chat conversation;
   logging in a chat queue open chat threads that the entity has initiated;
   removing from the chat queue any open chat threads initiated by the entity that receive a reply;
   determining if the entity is permitted to start the new chat conversation based at least in part on how many open chat threads a user has initiated;
   analyzing feedback associated with the entity;
   tracking positive feedback associated with the entity;
   awarding the entity with additional new chat threads based upon achieving a threshold amount of positive feedback; and
   based at least in part on the feedback, transmitting a challenge to the entity.

2. A method as recited in claim 1, wherein the determining comprises querying the chat queue for a number of open chat threads the entity has initiated.

3. A method as recited in claim 1, further comprising:
   responsive to a determination that the entity has less than a threshold number of open chat threads, permitting the entity to start the new chat conversation.

4. A method as recited in claim 1, further comprising:
   responsive to a determination that the entity has at least a threshold number of open chat threads, denying the request to start the new chat conversation.

5. A method as recited in claim 1, further comprising:
   indicating that the entity is permitted to start the new chat conversation; and
   responsive to the entity starting the new chat conversation, logging a new chat thread in the chat queue associated with the entity.

6. A method as recited in claim 5, further comprising:
   removing from the chat queue any open chat threads that time out.

7. One or more memory storage devices encoded with computer executable instructions that, when executed by a processor, perform operations comprising:
   logging in a chat queue open chat threads that an entity has initiated;
   removing from the chat queue any open chat threads initiated by the entity that receive a reply;
   determining if the entity is permitted to begin a new chat conversation based at least in part on a number of open chat threads initiated by the entity that remain in the chat queue;
   analyzing text that the entity has generated as part of a chat conversation;
   based at least in part on the analyzing, transmitting a challenge to the entity;
   receiving feedback associated with the entity; and
   based at least in part on the feedback, tracking positive feedback associated with the entity and awarding the entity additional new chat threads based upon achieving a threshold amount of positive feedback.

8. One or more memory storage devices as recited in claim 7, wherein the chat queue is configured to remove any open chat threads that time out.

9. One or more memory storage device as recited in claim 7, the operations further comprising:
responsive to a determination that the number of open chat threads initiated by the entity that remain in the chat queue is less than a threshold amount, permitting the entity to begin the new chat conversation.

10. A system comprising:
a processor;
a memory;
a request module stored in the memory and configured to be operated by the processor to determine if an entity is permitted to open a new chat thread based at least in part on a number of open chat threads that the entity has initiated;
a chat queue to track a number of open chat threads that the entity has initiated, wherein the chat queue is configured to remove any chat threads that receive a reply;
a timer to time each open chat thread in the chat queue and to remove any open chat threads that time out; and
a feedback module to receive feedback associated with a chat behavior of the entity, wherein the feedback module tracks positive feedback associated with the entity, wherein the system awards the entity additional new chat threads based upon achieving a threshold amount of positive feedback.

11. A system as recited in claim 10, wherein the request module is configured to provide an indication that the entity is not permitted to open a new chat thread in the event that the number of open chat threads that the entity has initiated is equal to or greater than a threshold amount.

12. A system as recited in claim 10, further comprising:
a challenge generator to generate challenges and to transmit challenges to the entity based at least in part on at least one of feedback associated with the entity and text analysis of text that the entity has generated as part of a chat conversation.

* * * * *

UNITED STATES PATENT AND TRADEMARK OFFICE
CERTIFICATE OF CORRECTION

| | | |
|---|---|---|
| PATENT NO. | : 7,779,079 B2 | Page 1 of 1 |
| APPLICATION NO. | : 11/760536 | |
| DATED | : August 17, 2010 | |
| INVENTOR(S) | : David A. Nichols et al. | |

It is certified that error appears in the above-identified patent and that said Letters Patent is hereby corrected as shown below:

In column 11, line 6, in Claim 9, delete "device" and insert -- devices --, therefor.

Signed and Sealed this
Fifteenth Day of March, 2011

David J. Kappos
*Director of the United States Patent and Trademark Office*